US008631862B2

(12) United States Patent
June

(10) Patent No.: US 8,631,862 B2
(45) Date of Patent: Jan. 21, 2014

(54) SELF-SEALING CHEMICAL INJECTION LINE COUPLING

(71) Applicant: Cameron International Corporation, Houston, TX (US)

(72) Inventor: David R. June, Houston, TX (US)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 13/735,030

(22) Filed: Jan. 6, 2013

(65) Prior Publication Data

US 2013/0118601 A1 May 16, 2013

Related U.S. Application Data

(63) Continuation of application No. 12/741,366, filed as application No. PCT/US2008/081032 on Oct. 23, 2008, now Pat. No. 8,347,916.

(60) Provisional application No. 60/990,254, filed on Nov. 26, 2007.

(51) Int. Cl.
*E21B 17/02* (2006.01)
*E21B 34/02* (2006.01)
*F16L 29/04* (2006.01)

(52) U.S. Cl.
USPC .. 166/90.1; 166/242.6; 166/344; 137/614.04; 251/149.6

(58) Field of Classification Search
USPC ......... 166/90.1, 242.6, 344; 137/613, 614.03, 137/614.04, 614.05, 627.5, 628; 251/149.6, 251/149.1
See application file for complete search history.

(56) References Cited

U.S. PATENT DOCUMENTS

| | | | | |
|---|---|---|---|---|
| 3,213,884 | A | 10/1965 | Moyer et al. | |
| 3,234,965 | A * | 2/1966 | Anderson | 137/614.04 |
| 4,637,470 | A | 1/1987 | Weathers et al. | |
| 4,754,813 | A | 7/1988 | Jennings et al. | |
| 5,385,169 | A | 1/1995 | Odelius | |
| 5,810,047 | A | 9/1998 | Kirkman | |
| 6,082,460 | A | 7/2000 | June | |
| 6,170,522 | B1 | 1/2001 | Tanida | |
| 6,227,245 | B1 | 5/2001 | Smith, III | |
| 6,575,430 | B1 | 6/2003 | Smith | |
| 6,588,452 | B2 | 7/2003 | Marquart | |
| 6,866,064 | B2 | 3/2005 | Nanni et al. | |
| 7,159,616 | B2 | 1/2007 | Watson et al. | |
| 7,913,974 | B2 | 3/2011 | Smith | |
| 8,113,287 | B2 | 2/2012 | Parfrey | |

(Continued)

FOREIGN PATENT DOCUMENTS

| | | |
|---|---|---|
| GB | 2132728 | 7/1984 |
| GB | 2184508 | 6/1987 |

OTHER PUBLICATIONS

PCT International Search Report and Written Opinion for PCTUS2008/081032, dated Feb. 26, 2009.

*Primary Examiner* — Jennifer H Gay
(74) *Attorney, Agent, or Firm* — Fletcher Yoder, P.C.

(57) ABSTRACT

A chemical injection line connector includes first and second couplings configured to automatically seal shut when the members are disengaged. A method for blocking contamination or pressure transfer of chemical injection lines includes securing first and second couplings to corresponding ends of a chemical injection line and automatically sealing the couplings shut when the couplings are disengaged.

32 Claims, 13 Drawing Sheets

(56) References Cited

U.S. PATENT DOCUMENTS

| | | | |
|---|---|---|---|
| 8,132,780 B2 | 3/2012 | Tibbitts | |
| 8,347,916 B2 * | 1/2013 | June | 137/613 |
| 2004/0103946 A1 | 6/2004 | Nanni et al. | |
| 2006/0102238 A1 | 5/2006 | Watson et al. | |
| 2009/0025926 A1 | 1/2009 | Briquet et al. | |
| 2010/0024907 A1 | 2/2010 | Tibbitts | |
| 2010/0229981 A1 | 9/2010 | June | |

* cited by examiner

SELF-SEALING CHEMICAL INJECTION LINE COUPLING

CROSS REFERENCE TO RELATED APPLICATIONS

This application claims priority to U.S. application Ser. No. 12/741,366, entitled "Self-Sealing Chemical Injection Line Coupling", filed on May 4, 2010, which is herein incorporated by reference in its entirety, which claims priority to PCT Patent Application No. PCT/US2008/081032, entitled "Self-Sealing Chemical Injection Line Coupling," filed Oct. 23, 2008, which is herein incorporated by reference in its entirety, and which claims priority to and benefit of U.S. Provisional Patent Application No. 60/990,254, entitled "Self-Sealing Chemical Injection Line Coupling", filed on Nov. 26, 2007, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to myriad other uses. Once a desired resource is discovered below the surface of the earth, drilling and production systems are often employed to access and extract the resource. These systems may be located onshore or offshore depending on the location of a desired resource.

Further, such systems generally include a wellhead assembly through which the resource is extracted. These wellhead assemblies may include a wide variety of components and/or conduits, such as various control lines, casings, valves, and the like, that control drilling and/or extraction operations. As will be appreciated, various control lines or other components of a production or transport system are typically coupled to one another to provide a path for hydraulic control fluid, chemical injections, or the like to be passed through the wellhead assembly. Such control lines are often disposed in various passages through components of the wellhead assembly, such as a tubing spool, a tubing hanger, a christmas tree, and/or a running tool.

The control lines may be surrounded in the passage by heavy drilling fluid, which is used to facilitate the drilling and removal of cuttings from a drill bore. When the control lines are disengaged, for example, to remove the running tool, christmas tree, or tubing hanger, it is desirable to keep the control lines relatively clear of contaminants, such as the heavy drilling fluid, so that downhole controls are not compromised due to clogs or damaged valves. Additionally, any fluid surrounding the coupling may be pressurized as a result of hydrostatic head pressure or pressure applied during well control or testing operations, and it is desirable to block that pressure from entering the fluid control system or downhole control lines if the control lines are engaged or disengaged.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, it is desirable to block heavy drilling fluid or pressurized fluid from entering chemical injection lines, particularly when the lines are disengaged. These chemical injection lines may be used to inject chemicals, such as methanol, polymers, surfactants, etc., into mineral wells to improve recovery. Because chemical injection lines are directly connected to the mineral reservoir, there is a possibility that a downhole pressure build-up may force mineral fluids up the injection lines, for example, if a downhole barrier such as a check valve is stuck open. It is not desirable to release mineral fluids into the environment, as this may result in significant environmental damage and fines. Additionally, it is not desirable to release mineral fluids or well pressure into a drilling riser or completion riser as it becomes expensive to control. Accordingly, an embodiment of the present invention provides a coupling which automatically blocks heavy drilling fluid or pressurized fluid from entering the chemical injection line when the coupling is disengaged while also blocking mineral fluids from escaping the line in the event of a downhole pressure build-up. It should be appreciated that, while this application describes embodiments in the context of a chemical injection line, the disclosed coupling could be used in other fluid lines. For example, fluid lines may exist in a subsea control system, an umbilical, a manifold, an annulus closure, or any other well component.

Figure 1:
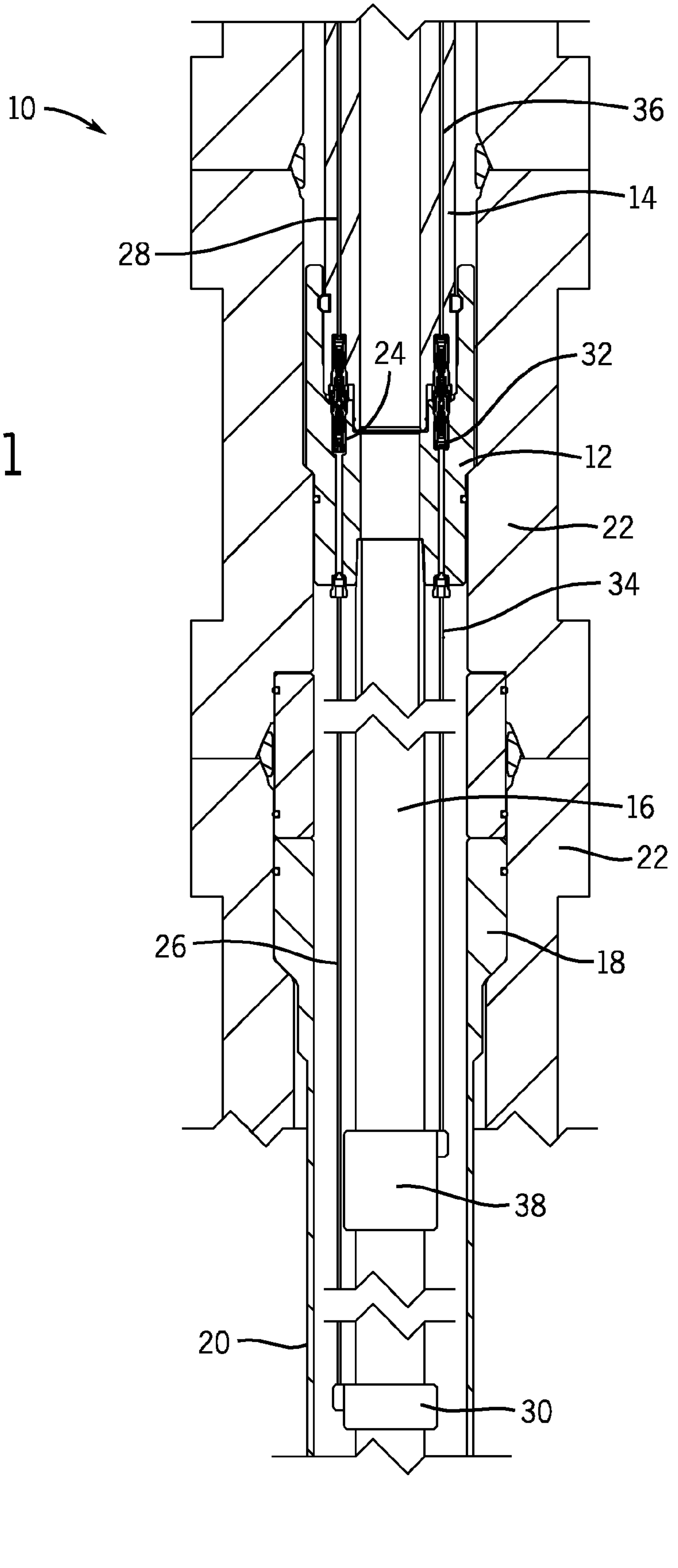
FIG. 1 is a partial cross-section of an embodiment of a mineral extraction system.

FIG. 1 illustrates components of an exemplary mineral extraction system 10. The mineral extraction system 10 may generally include a tubing hanger 12, a tubing hanger running tool 14, production tubing 16, a casing hanger 18, and a casing string 20. Upon completion of the system 10, the tubing hanger running tool 14 may be removed and a tree may be coupled to the tubing hanger 12. The tubing hanger 12 and the casing hanger 18 may be coupled to one or more wellhead members 22. In accordance with an embodiment of the present invention, one or more chemical injection couplers 24 may be utilized to couple a chemical delivery line 26 in the production tubing 16 with a chemical supply line 28 in the tubing hanger running tool 12 or the tree. Chemicals for injection into a mineral well may then be supplied to a downhole chemical injection valve 30. In addition, one or more self-sealing hydraulic control line couplings 32 may be utilized to couple a downhole control line 34 associated with the production tubing 16 with a hydraulic supply line 36 in the tubing hanger running tool 12 or the tree. Hydraulic fluid may then be supplied to a surface controlled subsurface safety valve (SCSSV) 38.

Figure 2:
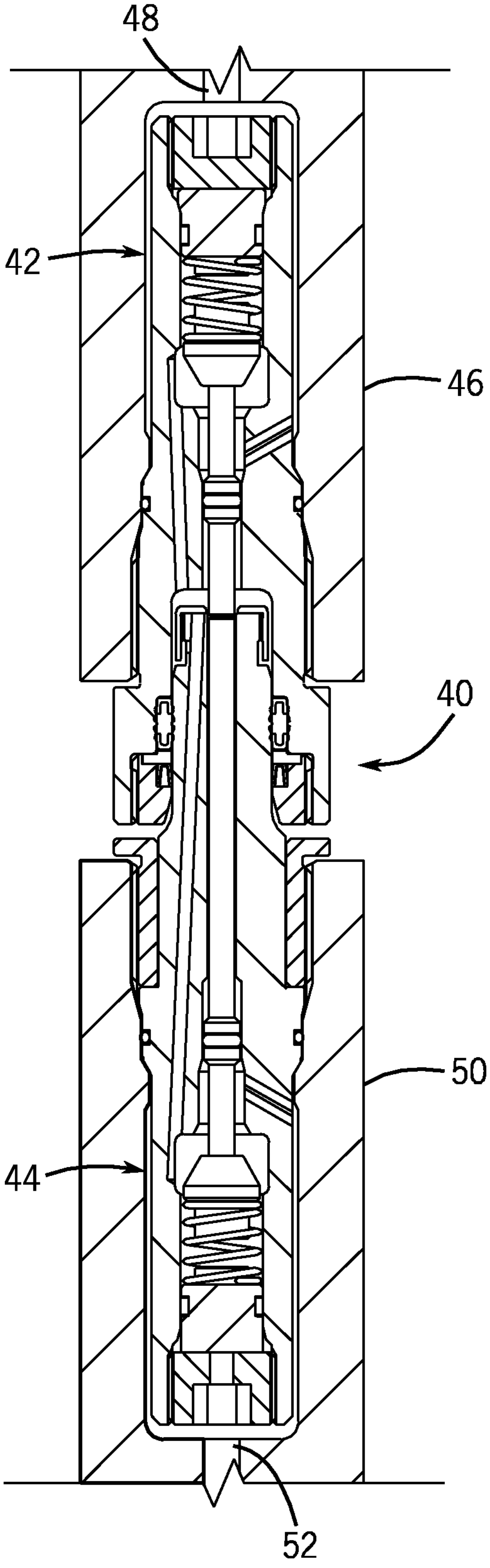
FIG. 2 is a partial cross-section of an embodiment of a chemical injection line coupling that may be used in the mineral extraction system of FIG. 1.

FIG. 2 depicts an exemplary embodiment of a stab-style chemical injection line coupler 40 that includes a female stab 42 and a male stab 44. The female stab 42 may be coupled to a running tool 46 which includes a chemical injection line 48. The chemical injection line 48 carries injection chemicals from an external source to the coupler 40. The female stab 42 may also be connected to what is colloquially referred to as a "christmas tree" (hereinafter, a "tree"), or any other well component having a chemical injection line running therethrough. The male stab 44 may be coupled to a tubing hanger 50. Simply put, the male and female stabs may be respectively arranged on any two wellhead components that are coupled to provide a continuous fluid passageway, for instance. A chemical injection line 52 disposed within the tubing hanger 50 may be used to transport injection chemicals from the coupler 40 to a mineral reservoir or wellhead component. In certain embodiments, the coupler 40 may be used in or coupled to a portion of a mineral extraction system, which may include a tree, a wellhead, a well, a mineral deposit (e.g., oil and/or gas), a valve, a casehead, a tubing hanger, tubing, a running tool, a manifold, an umbilical, or a combination thereof.

Figure 3:
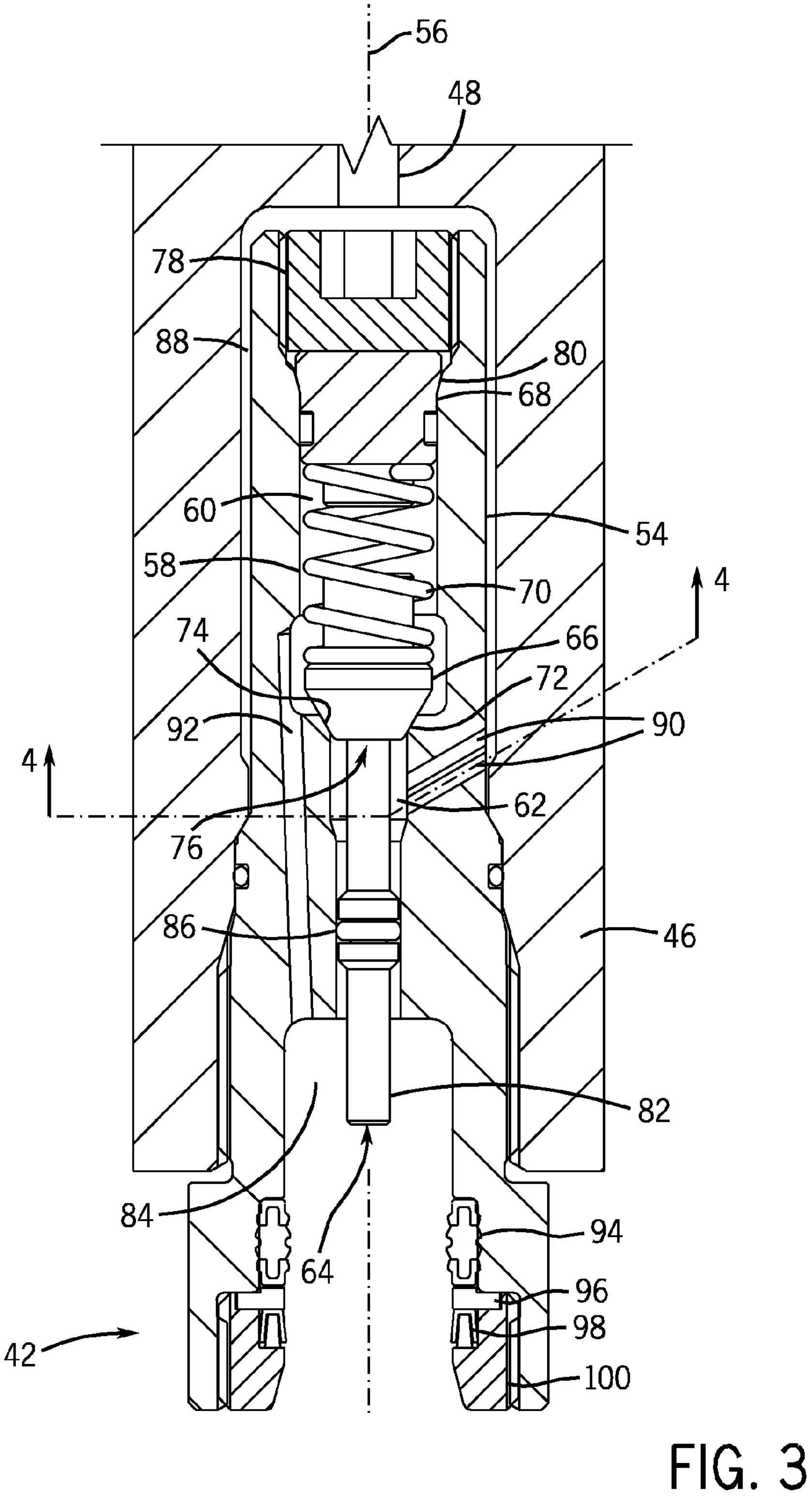
FIG. 3 is a partial cross-section of a first component of the chemical injection line coupling illustrated in FIG. 2.
Figure 4:
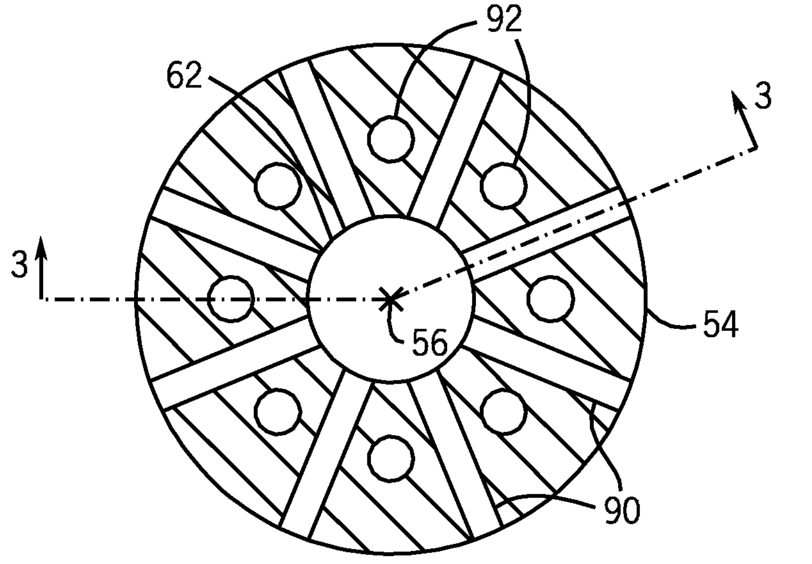
FIG. 4 is a cross-section of the first component of the chemical injection line coupling taken along line 4-4 of FIG. 3.

FIG. 3 illustrates an embodiment of the female stab 42 disconnected from the male stab 44. The female stab 42 is made of a generally cylindrical body 54. The body 54 may be metal, such as corrosion-resistant stainless steel. Components of the female stab 42 in FIG. 3 are illustrated along a cross-sectional line 3-3 of FIG. 4, which is rotated about an axis 56 of the generally cylindrical body 54. FIG. 4 is a cross section of the generally cylindrical body 54 taken along an angled line 4-4 of FIG. 3.

The body 54 may be screwed into or otherwise disposed within the running tool 46. A continuous axial bore 58 having varying diameters runs through the length of the body 54. The bore 58 may be divided into two general regions having dissimilar diameters, namely, a valve cavity 60 and a shaft cavity 62. Within each region, the diameter of the cavities 60 and 62 are generally similar. Situated within the bore 58 is a valve 64 configured to automatically close upon separation of the female stab 42 from the male stab 44. In the illustrated embodiment, the valve 64 includes a poppet 66 and a sealing plug 68 with a spring 70 disposed therebetween. The poppet 66 has a diameter greater than that of the shaft cavity 62 and is therefore blocked from advancing all the way into the shaft cavity 62. An angled surface 72 of the poppet 66 corresponds to an angled surface 74 of an opening 76 between the valve cavity 60 and the shaft cavity 62. The angled surfaces 72 and 74 may press together to form a metal seal. At the other end of the valve cavity 60, the sealing plug 68 may be secured within the bore 58 by a fastener 78, such as, for example, a hex socket set screw. Furthermore, in the illustrated embodiment, a shoulder 80 on the sealing plug 68 blocks the sealing plug 68 from moving within the valve cavity 60.

The poppet 66 is also coupled to a shaft 82 which extends through the shaft cavity 62 into a reception area 84 for receiving the male stab 44. The shaft 82 may be depressed to compress the spring 70 and displace the poppet 66, as described in more detail below. A seal 86, such as an o-ring, may be disposed around a portion of the shaft 82 or housed in the shaft cavity 62. The seal 86 and shaft 82 remain in the shaft cavity 62 as the shaft 82 is depressed and released. The seal 86 may block fluid disposed in the shaft cavity 62 between the poppet 66 and the seal 86 from seeping into the reception area 84 and vice versa.

In use, the female stab 42 may be exposed to applied pressure or pressure from heavy well fluids. The described structures are configured such that the heavy well fluid is automatically blocked from entering and contaminating the chemical injection passages when the female stab 42 is disengaged from the male stab 44. Injection chemicals may enter the female stab 42 through the line 48. A coupling cavity 88 is defined between the body 54 and the running tool 46. Injection chemicals may enter the coupling cavity 88 and flow through radial holes 90 to the shaft cavity 62. When the stabs 42 and 44 are disengaged, heavy well fluid may enter the female stab 42 through the reception area 84 and flow through one or more axial bores 92 to the valve cavity 60. Multiple radial holes 90 and axial bores 92 may be disposed around the axis 56 of the generally cylindrical body 54, as illustrated in FIG. 4. As can be seen in FIG. 4, the partial cross section illustrated in FIG. 3 is taken along rotated line 3-3 to better illustrate both the radial holes 90 and the axial bores 92. Furthermore, the cross section of FIG. 4 is taken along angle line 4-4 to better illustrate the radial holes 90.

When the shaft 82 is not depressed, such as when the female stab 42 is disengaged from the male stab 44, the spring 70 automatically biases the poppet 66 into the opening 76. The heavy well fluids in the valve cavity 60 further apply pressure to the poppet 66, thereby creating a metal seal between the angled surface 72 of the poppet 66 and the angled surface 74 of the opening 76. Counter pressure may also be applied to the poppet 66 from the injection chemicals in the shaft cavity 62; however this pressure is generally less than the pressure on the poppet 66 from the heavy drilling fluid and the spring 70. The pressure from the injection chemicals may build up enough to overcome the pressure from the heavy drilling fluid and the spring 70, for example, if the injection chemical source is turned on to flush the heavy drilling fluid from the female stab 42 before it is coupled to the male stab 44. If the pressure of the injection chemicals in the shaft cavity 62 becomes great enough, the poppet 66 may be displaced from the opening 76 to alleviate the pressure in the injection chemicals. If the pressure in the injection chemicals decreases, the poppet 66 is again automatically biased into the opening 76 by the spring 70 and the pressure of the fluid in the valve cavity 60 to create the metal seal.

Furthermore, the female stab 42 includes a seal 94 configured to block leakage of the injection chemicals during use. The seal 94 may, for instance, be an elastomeric seal with metal caps (e.g., a metal endcap seal). A shoulder 96 holds the seal 94 in place in the body 54. A one-directional seal 98 is disposed below the seal 94 to allow escape of the heavy drilling fluid from the coupler 40 during coupling engagement, as described in more detail below. A nut 100 secures the one-directional seal 98 to the body 54 and holds the shoulder 96 in place.

Figure 5:
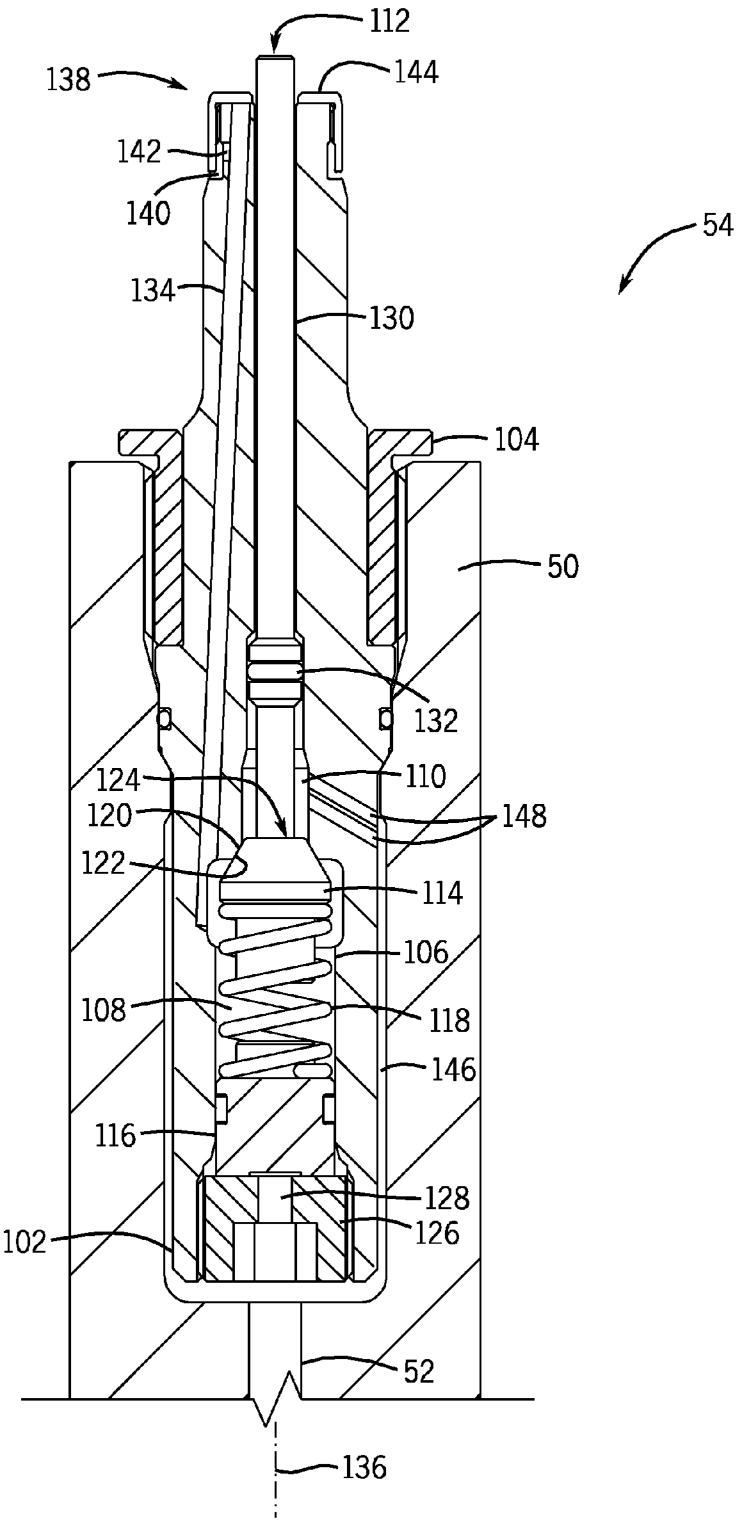
FIG. 5 is a partial cross-section of a second component of the chemical injection line coupling illustrated in FIG. 2.

FIG. 5 illustrates an embodiment of the male stab 44, which includes many of the same features described in the female stab 42. The male stab 44 includes a generally cylindrical body 102 made of metal, such as corrosion resistant stainless steel. The body 102 may be secured to the tubing hanger 50 via a nut 104. A continuous axial bore 106 having varying diameters runs through the length of the body 102. The bore 106 may be divided into a valve cavity 108 and a shaft cavity 110 having dissimilar diameters. Within each region, the diameter of the cavities 108 and 110 are generally similar. The valve cavity 108 includes a valve 112 having a poppet 114 and a sealing plug 116 with a spring 118 disposed therebetween. The poppet 114 has a diameter greater than that of the shaft cavity 110 and is therefore blocked from advancing all the way into the shaft cavity 110. An angled surface 120 of the poppet 114 corresponds to an angled surface 122 of an opening 124 between the valve cavity 108 and the shaft cavity 110. The angled surfaces 120 and 122 may press together to form a metal seal.

At the other end of the valve cavity 108, a fastener 126, such as a hex socket set screw, secures the sealing plug 116 within the bore 106. The sealing plug 116 may have a generally uniform diameter, enabling the sealing plug 116 to move within the valve cavity 108. In addition, the fastener 126 may include a bore 128 which enables fluid flow through the fastener 126. Accordingly, when fluid pressure in the chemical injection line 52 builds up, fluid may flow through the fastener 126 and move the sealing plug 116 into contact with the poppet 114, compressing the spring 118, and ensuring the valve 112 remains closed.

The poppet 114 is coupled to a shaft 130 which extends through the shaft cavity 110 and out the body 102. The shaft 130 may be depressed to compress the spring 118 and displace the poppet 114, as described in more detail below. A seal 132, such as an o-ring, may be disposed around a portion of the shaft 130. The seal 132 and the shaft 130 remain in the shaft cavity 110 as the shaft 130 is depressed and released.

As with the female stab 42, the male stab 44 may be exposed to applied pressure or pressure from heavy well fluids. Furthermore, the tubing hanger 50 to which the male stab 44 is coupled may supply injection chemicals to the mineral reservoir. In order to block injection chemicals and other mineral fluids from the reservoir from escaping into the environment, the male stab 44 is configured such that the pressure in the chemical injection line 52 may automatically close the valve 112. Generally, during use, injection chemicals flow through the coupler 40 (FIG. 2) before the male stab 44 is disengaged from the female stab 42. Accordingly, cavities and passages in the male stab 44 may contain injection chemicals before the male stab 44 is exposed to heavy well fluids. For example, injection chemicals may be present in an axial bore 134 and the valve cavity 108. As with the female stab 42, the male stab 44 may include multiple axial bores 134 disposed around an axis 136.

When the male stab 44 is disengaged from the female stab 42, the described components operate to automatically seal the chemical injection line 52 from contamination by heavy drilling fluids. That is, the spring 118 automatically biases the poppet 114 into the opening 124 when the shaft 130 is not depressed. Furthermore, pressure applied to the poppet 114 from fluids in the valve cavity 108 supplement the spring 118 to create the metal seal between the angled surface 120 of the poppet 114 and the angled surface 122 of the opening 124. Pressure is conveyed from the heavy drilling fluid outside the male stab 44 to the poppet 114 by compression of the injection chemicals within the male stab 44. Heavy drilling fluid is generally impeded from entering the male stab 44 by a fluid trap 138. Within an indent 140, a radial hole 142 provides access to the axial bore 134. A cover 144 substantially covers the indent 140, leading heavy drilling fluid to enter the indent 140 below the radial hole 142, thereby creating the fluid trap 138. That is, the heavy drilling fluid remains at the bottom of the indent 140, while the injection chemicals remain in the radial hole 142 and the axial bore 134. In addition to impeding entrance of heavy drilling fluid into the male stab 44, the fluid trap 138 blocks displacement of the injection chemicals by the heavy drilling fluid; therefore, any heavy drilling fluid that enters the male stab 44 merely compresses the injection chemicals in the axial bore 134 and the valve cavity 108. Pressure on the poppet 114 from the compressed injection chemicals automatically presses the poppet 114 into the opening 124, thus supplementing the spring 118 to form the metal seal.

In addition to automatically sealing the chemical injection lines from contamination, the male stab 44 automatically seals in the injection chemicals. As with the female stab 42, pressure in the injection chemicals from the mineral reservoir may be conveyed through a coupling cavity 146 and one or more radial holes 148 to the shaft cavity 110. Multiple radial holes 148 may also be disposed around the axis 136. In addition, pressure in the injection chemicals may also be conveyed through the bore 128 in the fastener 126 to the sealing plug 116. Pressure on the sealing plug 116 may move the sealing plug 116 into contact with the poppet 114. Accordingly, similar pressure is applied to the poppet 114 in the shaft cavity 110 and sealing plug 116 in the valve cavity 108. However, the sealing plug 116 has a greater surface area on the valve cavity 108 side than that of the poppet 114 on the shaft cavity 110 side. Therefore, the force pressing the valve 112 closed is greater than the force pressing the valve 112 opened, and the valve 112 remains closed even when pressure builds up in the chemical injection line 52.

The design of the female stab 42 and the male stab 44 enables automatic operation of the valves, such as the poppets 66 and 114 in the illustrated embodiment. Merely disengaging the female stab 42 from the male stab 44 closes the valves. That is, no further controls must be implemented to close the fluid pathways in the coupling members. Furthermore, the forces on the valves from the surrounding fluids (e.g., heavy drilling fluids) ensure that they remain closed, even under very high pressure. Indeed, the valves close tighter as more pressure is applied from surrounding fluids, as described above.

Figure 6:
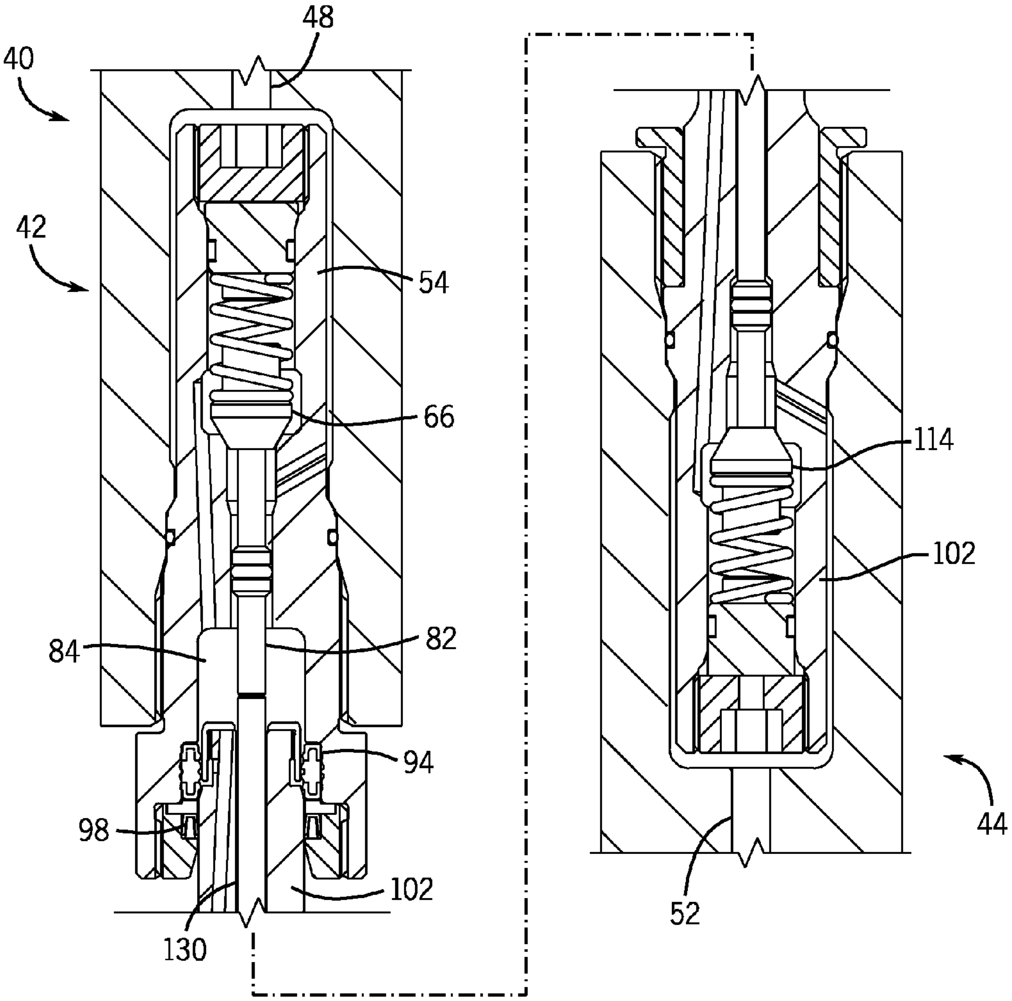
FIG. 6 is a partial cross-section of the partially engaged components of the chemical injection line coupling illustrated in FIG. 2.

Turning to FIG. 6, the female stab 42 and male stab 44 are illustrated in a partially coupled state. In this partially coupled state, the female shaft 82 is in contact with the male shaft 130, however neither shaft is displaced, as evidenced by the metal seals between the bodies 54 and 102 and the poppets 66 and 114, respectively. Prior to coupling engagement, the reception area 84 may be filled with heavy drilling fluid. As the female stab 42 and the male stab 44 are pushed together, heavy drilling fluid may be displaced from the reception area 84 by flowing out through the space between the seal 94 and the male body 102 past the one-directional seal 98. The reception area 84 may be flushed or purged by applying injection chemicals through the chemical injection line 48, thereby increasing the pressure enough to displace the poppet 66 and enable flow of injection chemicals through the female stab 42, as described above in regard to FIG. 3. Differential pressure or heavy drilling fluid is blocked from entering the reception area 84 during coupling by the one-directional seal 98. Additionally, the one-directional seal 98 allows trapped fluid to vent, or escape the reception area 84, until the female stab 42 and the male stab 44 are engaged.

Figure 7:
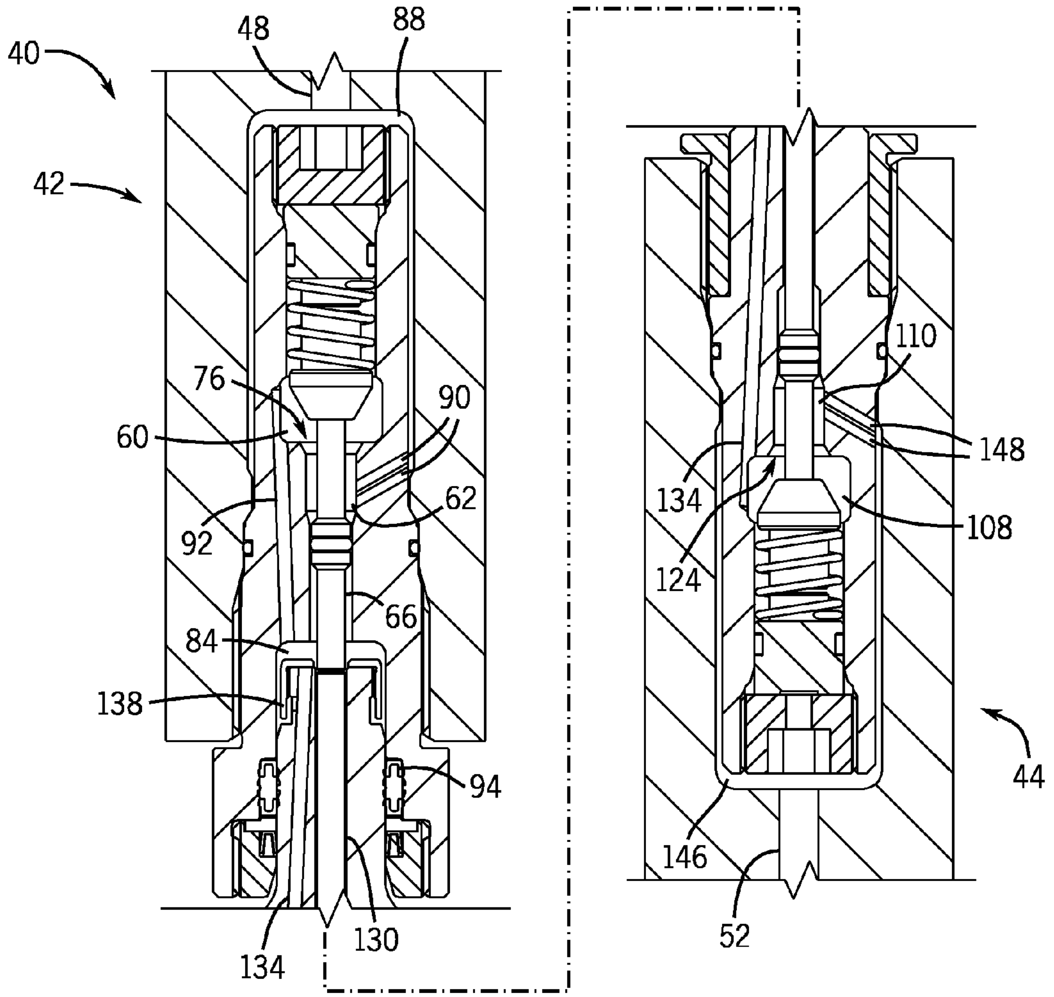
FIG. 7 is a partial cross-section of the engaged components of the chemical injection line coupling illustrated in FIG. 2.

As the female stab 42 and the male stab 44 are pushed together, contact force on the shafts 82 and 130 displaces the poppets 66 and 114, respectively, as illustrated in FIG. 7. In this illustration, injection chemicals may flow from the fluid source to the chemical injection valve via the following path: chemical injection line 48; coupling cavity 88; radial holes 90; shaft cavity 62; opening 76; valve cavity 60; axial bore 92; reception area 88; fluid trap 138; axial bore 134; valve cavity 108; opening 124; shaft cavity 110; radial holes 148; coupling cavity 146; and chemical injection line 52. Furthermore, the seal 94 blocks injection chemicals from leaking out of the coupling and heavy drilling fluid from entering the assembly.

Figure 8:
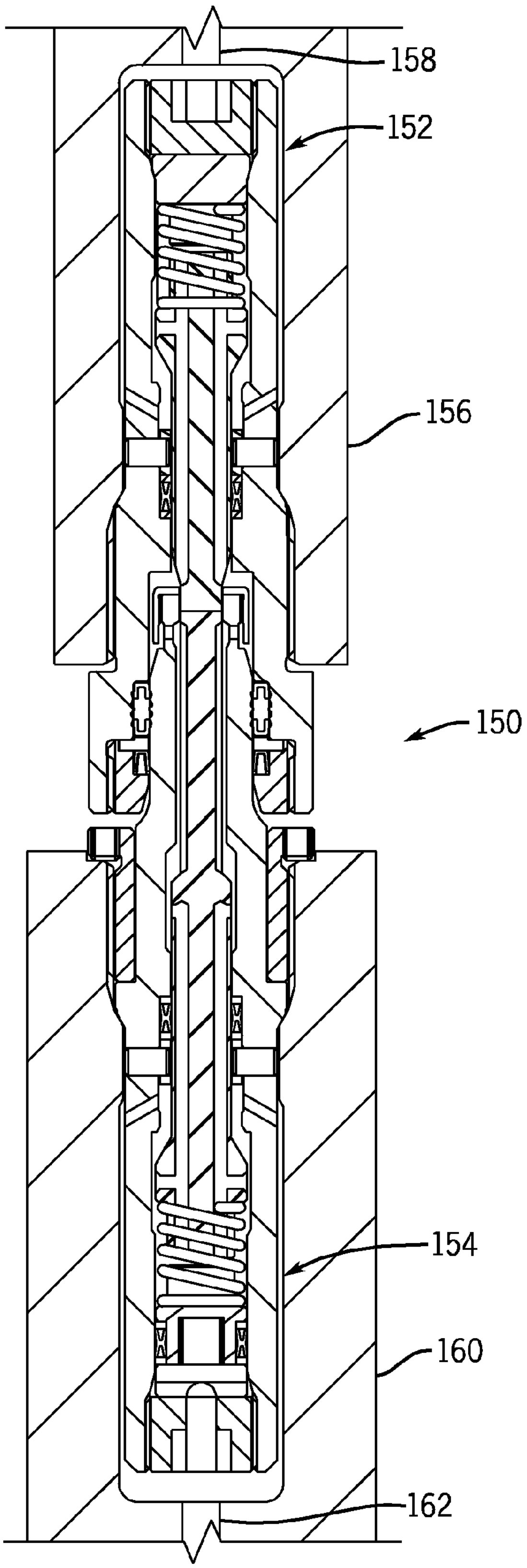
FIG. 8 is a partial cross-section of another embodiment of a chemical injection line coupling that may be used in the mineral extraction system of FIG. 1.

FIG. 8 depicts another exemplary embodiment of a stab-style chemical injection line coupler 150 that includes a female stab 152 and a male stab 154. As with the embodiment illustrated in FIGS. 2-7, the female stab 152 may be coupled to a running tool 156 having a chemical injection line 158. The female stab 152 may also be connected to a tree or any other well component having a chemical injection line running therethrough. The male stab 154 may be coupled to a tubing hanger 160. A chemical injection line 162 disposed within the tubing hanger 160 may be used to transport injection chemicals from the coupler 150 to a mineral reservoir or wellhead component.

Figure 9:
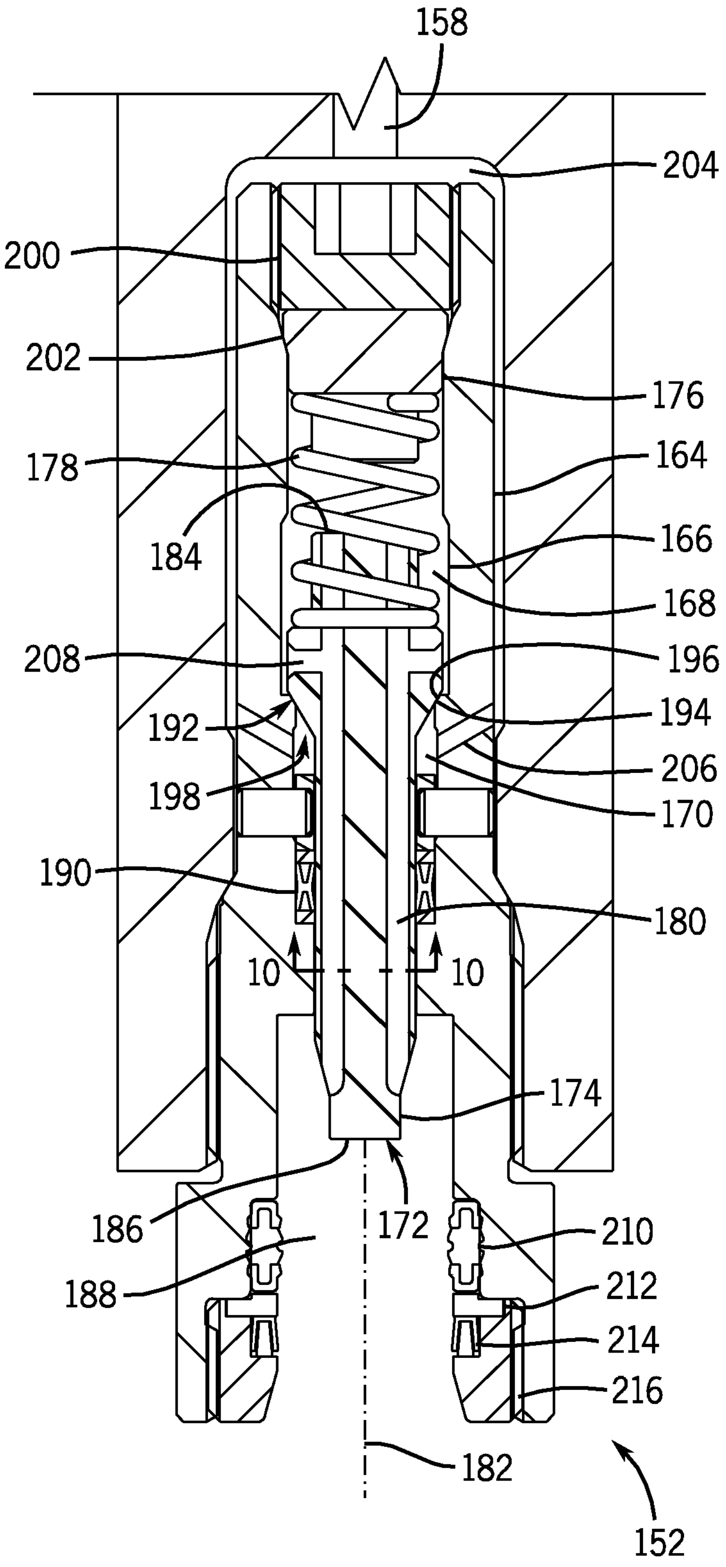
FIG. 9 is a partial cross-section of a first component of the chemical injection line coupling illustrated in FIG. 8.

FIG. 9 illustrates an embodiment of the female stab 152 disconnected from the male stab 154. The female stab 152 is made of a generally cylindrical body 164. The body 164 may be metal, such as corrosion-resistant stainless steel. The generally cylindrical body 164 may be screwed into or otherwise disposed within the running tool 156. A continuous axial bore 166 having varying diameters runs through the length of the body 164. The bore 166 may be divided into two general regions having dissimilar diameters, namely, a spring cavity 168 and a seal cavity 170. Situated within the bore 166 is a valve 172 configured to automatically close upon separation of the female stab 152 from the male stab 154.

Figure 10:
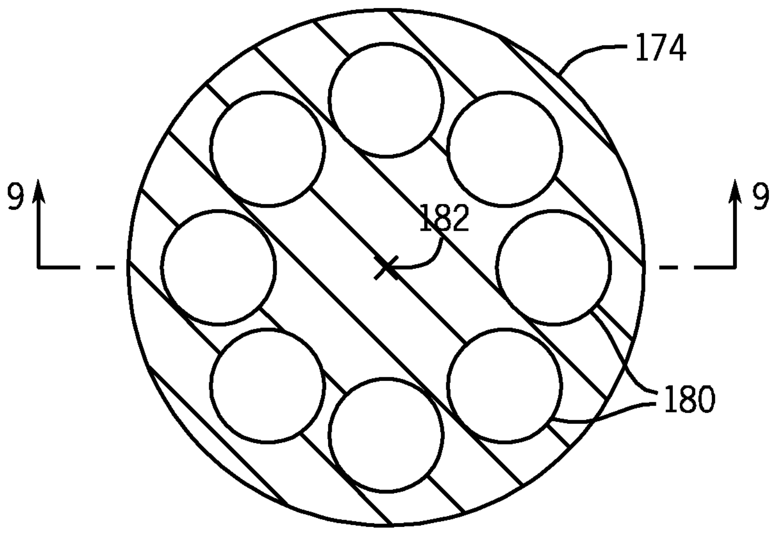
FIG. 10 is a cross-section of the first component of the chemical injection line coupling taken along line 10-10 of FIG. 9.

In the illustrated embodiment, the valve 172 includes a shaft 174 and a sealing plug 176 having a spring 178 disposed therebetween in the spring cavity 168. The shaft 174 may have a plurality of axial bores 180 disposed therethrough. The axial bores 180 may be generally disposed about an axis 182 running through the center of the shaft 174, as illustrated in FIG. 10. The axial bores 180 may extend from a first end 184 of the shaft 174 and be in fluid communication with the spring cavity 168. Near a second end 186 of the shaft 174, the axial bores 180 may be in fluid communication with a reception area 188 for receiving the male stab 154.

A seal 190 may be disposed around the shaft 174 in the seal cavity 170. The seal 190 is configured such that fluid is blocked from seeping between the seal cavity 170 and the reception area 188 around the shaft 174 regardless of whether the valve 172 is opened or closed. In addition, a metal seal 192 may block fluid from seeping between the spring cavity 168 and the seal cavity 170 when the valve 172 is closed. The shaft 174 may have a varying diameter including an angled surface 194. The angled surface 194 corresponds to an angled surface 196 of an opening 198 between the spring cavity 168 and the seal cavity 170. The angled surfaces 194 and 196 may press together to form the metal seal 192. The shaft 174 may be depressed to compress the spring 178 and open the valve 172, as described in more detail below. At the other end of the spring cavity 168, the sealing plug 176 may be secured within the bore 166 by a fastener 200, such as, for example, a hex socket set screw. Furthermore, in the illustrated embodiment, a shoulder 202 on the sealing plug 176 blocks the sealing plug 176 from moving within the spring cavity 168.

In use, the female stab 152 may be exposed to applied pressure or pressure from heavy well fluids. The described structures are configured such that the heavy well fluid is automatically blocked from entering and contaminating the chemical injection passages when the female stab 152 is disengaged from the male stab 154. Injection chemicals may enter the female stab 152 through the line 158. A coupling cavity 204 is defined between the body 164 and the running tool 156. Injection chemicals may enter the coupling cavity 204 and flow through radial holes 206 to the seal cavity 170. When the stabs 152 and 154 are disengaged, heavy well fluid may enter the female stab 152 through the reception area 188 and flow through the axial bores 180 to the spring cavity 168. In addition, radial holes 208 may provide a pathway between the axial bores 180 and the circumference of the shaft 174 through which heavy fluid may flow to the spring cavity 168.

When the shaft 174 is not depressed, such as when the female stab 152 is disengaged from the male stab 154, the spring 178 automatically biases the angled surface 194 of the shaft 174 into the opening 198. The heavy well fluids in the spring cavity 168 further apply pressure to the shaft 174, thereby supplementing the spring biasing force to provide the metal seal 192 between the angled surface 194 of the shaft 174 and the angled surface 196 of the opening 198. Counter pressure may also be applied to the shaft 174 from the injection chemicals in the seal cavity 180; however this pressure is generally less than the pressure on the shaft 174 from the heavy drilling fluid and the spring 178. The pressure from the injection chemicals may build up enough to overcome the pressure from the heavy drilling fluid and the spring 178, for example, if the injection chemical source is turned on to flush the heavy drilling fluid from the female stab 152 before it is coupled to the male stab 154. If the pressure of the injection chemicals in the seal cavity 170 becomes great enough, the shaft 174 may be displaced from the opening 198 to alleviate the pressure in the injection chemicals. If the pressure in the injection chemicals decreases, the angled surface 194 of the shaft 174 is again automatically biased into the opening 198 by the spring 178 and the pressure of the fluid in the spring cavity 168 to create the metal seal 192.

Furthermore, the female stab 152 includes a seal 210 configured to block leakage of the injection chemicals during use. The seal 210 may, for instance, be an elastomeric seal with metal caps (e.g., a metal endcap seal). A shoulder 212 holds the seal 210 in place in the body 164. A one-directional seal 214 is disposed below the seal 210 to allow escape of the heavy drilling fluid from the coupler 150 during coupling engagement, as described in more detail below. A nut 216 secures the one-directional seal 214 to the body 164 and holds the shoulder 212 in place.

Figure 11:
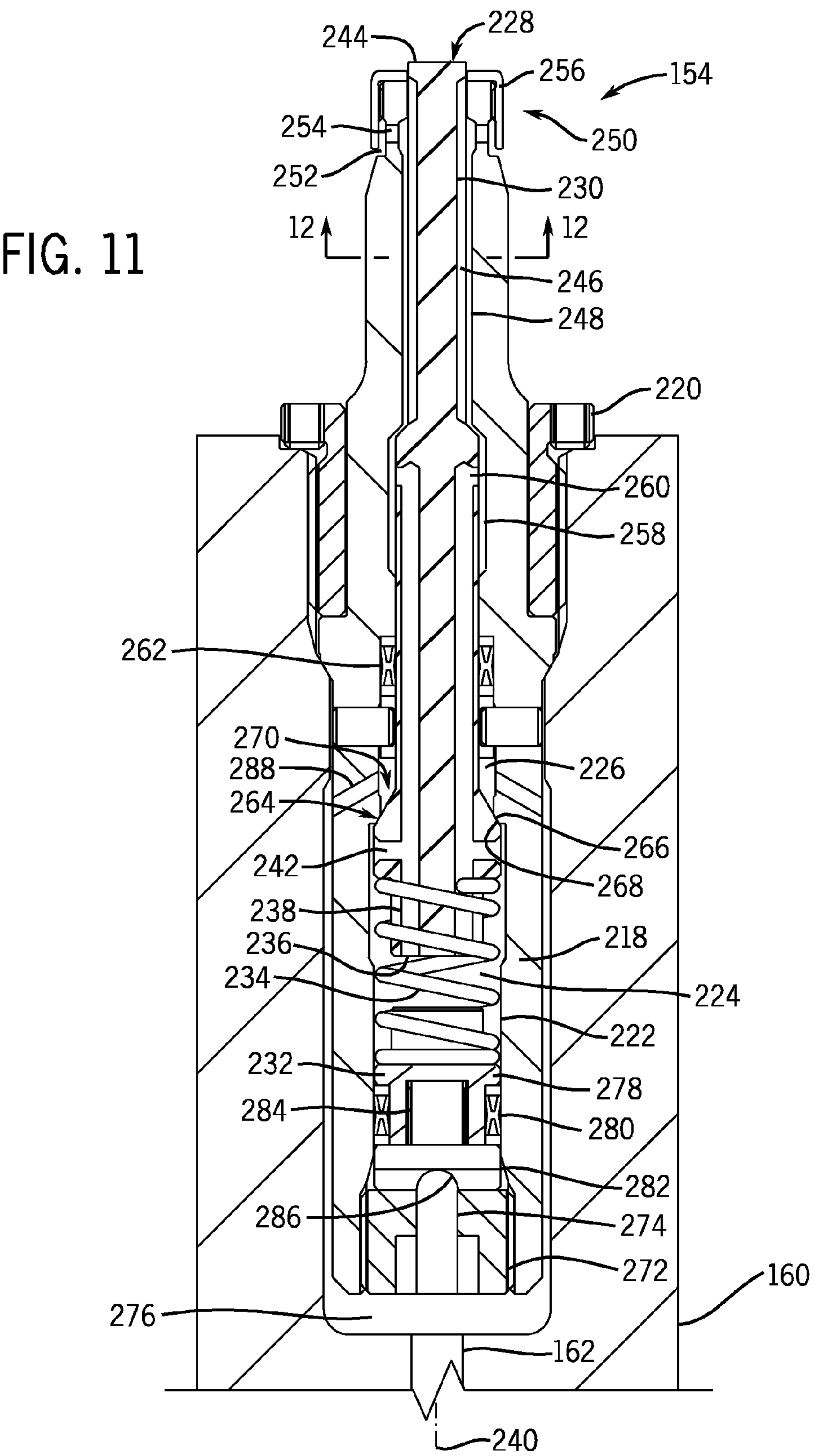
FIG. 11 is a partial cross-section of a second component of the chemical injection line coupling illustrated in FIG. 8.

FIG. 11 illustrates an embodiment of the male stab 154, which includes many of the same features described in the female stab 152. The male stab 154 includes a generally cylindrical body 218 made of metal, such as corrosion resistant stainless steel. The body 218 may be secured to the tubing hanger 160 via a nut 220. A continuous axial bore 222 having varying diameters runs through the length of the body 218. The bore 222 may be divided into a spring cavity 224 and a seal cavity 226 having dissimilar diameters. Situated within the bore 222 is a valve 228 configured to automatically close upon separation of the female stab 152 from the male stab 154.

Figure 12:
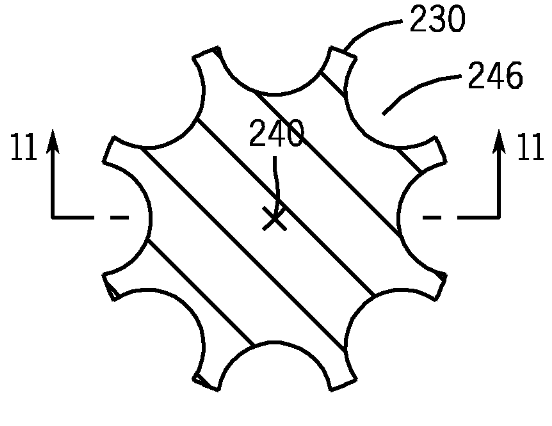
FIG. 12 is a cross-section of the second component of the chemical injection line coupling taken along line 12-12 of FIG. 11.

In the illustrated embodiment, the valve 228 includes a shaft 230 and a sealing plug 232 having a spring 234 disposed therebetween in the spring cavity 224. A portion of the shaft 230 near a first end 236 may have a plurality of axial bores 238 disposed therethrough similar to the axial bores 180 in the shaft 174 of the female stab 152. The axial bores 238 may be generally disposed about an axis 240 running through the center of the shaft 230. At the first end 236 of the shaft 230, the axial bores 238 may be in fluid communication with the spring cavity 224. In addition, radial holes 242 may provide further pathways from the axial bores 238 to the outer circumference of the shaft 230. A portion of the shaft 230 near a second end 244 may include notches 246 to facilitate fluid flow around the shaft 230 through the bore 222. FIG. 12 is a cross-section of the shaft 230 along a line 12-12. The notches 246 may be semi-circular, as illustrated in FIG. 12, or may be any other shape which provides fluid passages 248 between the shaft 230 and the bore 222. Fluid exterior to the male stab 154 may enter through a fluid trap 250. Within an indent 252, a radial hole 254 provides access to the fluid passages 248. A cover 256 substantially covers the indent 252, leading fluid to enter the indent 252 below the radial hole 254, thereby creating the fluid trap 250.

The portion of the shaft 230 containing the axial bores 238 may have a larger diameter than the portion of the shaft 230 having the notches 246. Accordingly, the continuous bore 222 through which the shaft 230 is disposed may have an indentation 258 around the shaft 230 where the shaft configuration transitions from the notches 246 to the axial bores 238. Radial holes 260 provide a pathway for fluid communication between the axial bores 238 and the indentation 258. A seal 262 blocks seepage of fluids between the indentation 258 and the seal cavity 226. The seal 262 may be disposed within the seal cavity 226, as illustrated in the present embodiment, or may be disposed around the shaft 230.

In addition, a metal seal 264 may block fluid from seeping between the spring cavity 224 and the seal cavity 226 when the valve 228 is closed. The shaft 230 may have a varying diameter including an angled surface 266. The angled surface 266 corresponds to an angled surface 268 of an opening 270 between the spring cavity 224 and the seal cavity 226. The angled surfaces 266 and 268 may press together to form the metal seal 264. The shaft 230 may be depressed to compress the spring 234 and open the valve 228, as described in more detail below.

At the other end of the spring cavity 224, the sealing plug 232 may be secured within the bore 222 by a fastener 272, such as, for example, a hex socket set screw. The fastener 272 may have a bore 274 to enable the flow of fluid therethrough from a coupling cavity 276. Furthermore, in the illustrated embodiment, the sealing plug 232 includes a spring engagement body 278 surrounded by a seal 280. The seal 280 blocks the seepage of fluid between the spring cavity 24 and the coupling cavity 276 around the sealing plug 232. A fluid reception body 282 may be coupled to the spring engagement body 278, for example, via a fastener 284. The fluid reception body 282 may be configured to increase the surface area of the sealing plug 232 in fluid communication with the coupling cavity 276, as described below. For example, the fluid reception body 282 may include an indent 286 or a similar feature. The sealing plug 232 may advance into the spring cavity 224 when pressure is applied to the fluid reception body 282.

As with the female stab 152, the male stab 154 may be exposed to applied pressure or pressure from heavy well fluids. Furthermore, the tubing hanger 160 to which the male stab 154 is coupled may supply injection chemicals to various valves, such as the chemical injection valve. In order to block the downhole minerals and chemicals from escaping up the injection lines, the male stab 154 is configured such that fluid pressure from sources external to the male stab 154, such as heavy drilling fluid or downhole fluids in the chemical injection line 162, further biases the valve 228 closed.

Generally, during use, injection chemicals flow through the coupler 150 (FIG. 8) before the male stab 154 is disengaged from the female stab 152. Accordingly, cavities and passages in the male stab 154 may contain injection chemicals before the male stab 154 is exposed to heavy well fluids. For example, injection chemicals may be present in the fluid trap 250, the fluid passages 248, the axial bores 238, and the spring cavity 224, and intervening areas. When the male stab 154 is disengaged from the female stab 152, the described components operate to automatically seal the chemical injection line 162 from contamination by heavy drilling fluids. That is, the spring 234 automatically biases the valve 228 closed when the shaft 230 is not depressed. Furthermore, pressure applied to the shaft 230 from fluids in the spring cavity 224 supplement the spring 234 to create the metal seal 264 between the angled surface 266 of the shaft 230 and the angled surface 268 of the opening 270. Pressure is conveyed from the heavy drilling fluid outside the male stab 154 to the shaft 230 by compression of the injection chemicals within the male stab 154. That is, the external heavy drilling fluid attempts to enter the male stab 154 through the fluid trap 250. The heavy fluid remains at the bottom of the indent 252, while the injection chemicals remain in the radial holes 254 and the fluid passages 248. In addition to impeding entrance of heavy drilling fluid into the male stab 154, the fluid trap 250 blocks displacement of the injection chemicals by the heavy drilling fluid; therefore, any heavy drilling fluid that enters the male stab 154 merely compresses the injection chemicals in the fluid passages 248, the axial bores 238, and the spring cavity 224. Pressure on the shaft 230 from the compressed injection chemicals automatically supplements pressure from the spring 234 to form the metal seal 264.

In addition to automatically sealing the chemical injection lines from contamination, the male stab 154 automatically seals in the injection chemicals and downhole minerals. Pressure in the injection chemicals from the mineral reservoir may be conveyed through the chemical injection line 162 and the coupling cavity 276 through one or more radial holes 288 to the seal cavity 226. Multiple radial holes 288 may be disposed around the axis 240. In addition, pressure in the injection chemicals may also be conveyed through the bore 274 in the fastener 272 to the sealing plug 232. Pressure on the sealing plug 232 may move the sealing plug 232 into contact with the shaft 230. Accordingly, similar pressure is applied to the shaft 230 in the seal cavity 226 and sealing plug 232 in the valve cavity 224. However, the fluid reception body 282 of the sealing plug 232 has a greater surface area < > than that of the shaft 230 in the seal cavity 226. Therefore, the force pressing the valve 228 closed is greater than the force pressing the valve 228 opened, and the valve 228 remains closed even when pressure builds up in the chemical injection line 162.

The design of the female stab 152 and the male stab 154 enables automatic operation of the valves 172 and 228. Merely disengaging the female stab 152 from the male stab 154 closes the valves 172 and 228. That is, no further controls must be implemented to close the fluid pathways in the coupling members. Furthermore, the forces on the valves 172 and 228 from the surrounding fluids (e.g., heavy drilling fluids) ensure that they remain closed, even under very high pressure. Indeed, the valves 172 and 228 close tighter as more pressure is applied from surrounding fluids, as described above.

Figure 13:
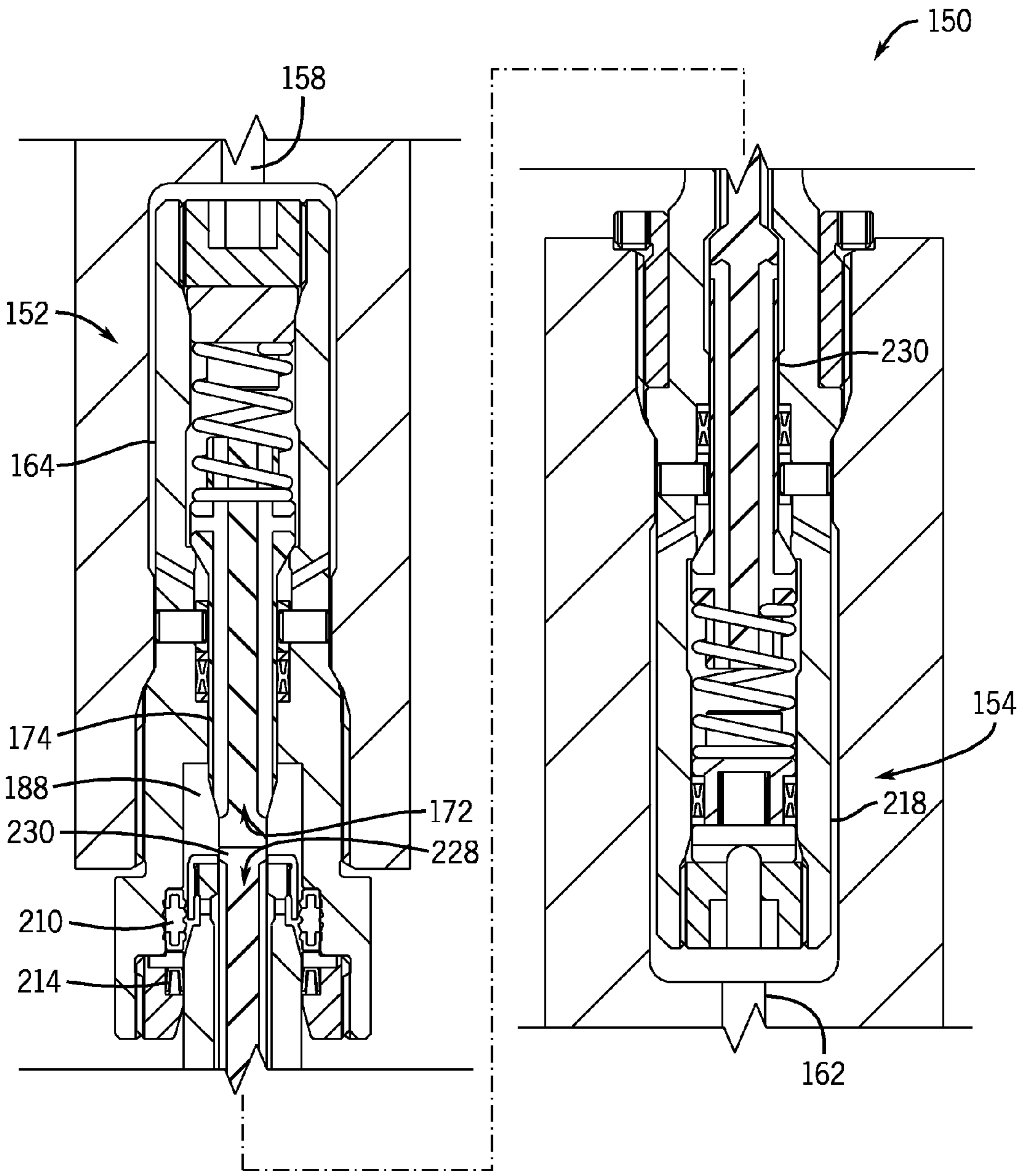
FIG. 13 is a partial cross-section of the partially engaged components of the chemical injection line coupling illustrated in FIG. 8.

FIG. 13 illustrates the female stab 152 and the male stab 154 in a partially coupled state. In this partially coupled state, the female shaft 174 is in contact with the male shaft 230, however neither shaft is displaced, as evidenced by the metal seals between the bodies 164 and 218 and the shafts 174 and 230, respectively. Prior to engagement of the coupler, the reception area 188 may be filled with heavy drilling fluid. As the female stab 152 and the male stab 154 are pushed together, heavy drilling fluid may be displaced from the reception area 188 by flowing out through the space between the seal 210 and the male body 218 past the one-directional seal 214. The reception area 188 may be flushed or purged by applying fluid through the chemical injection line 158, thereby increasing the pressure enough to displace the shaft 230 and enable flow of injection chemicals through the female stab 152, as described above in regard to FIG. 9. Differential pressure or heavy drilling fluid is blocked from entering the reception area 188 during coupling by the one-directional seal 214. Additionally, the one-directional seal 214 allows trapped fluid to vent, or escape the reception area 188, until the female stab 152 and the male stab 154 are engaged.

Figure 14:
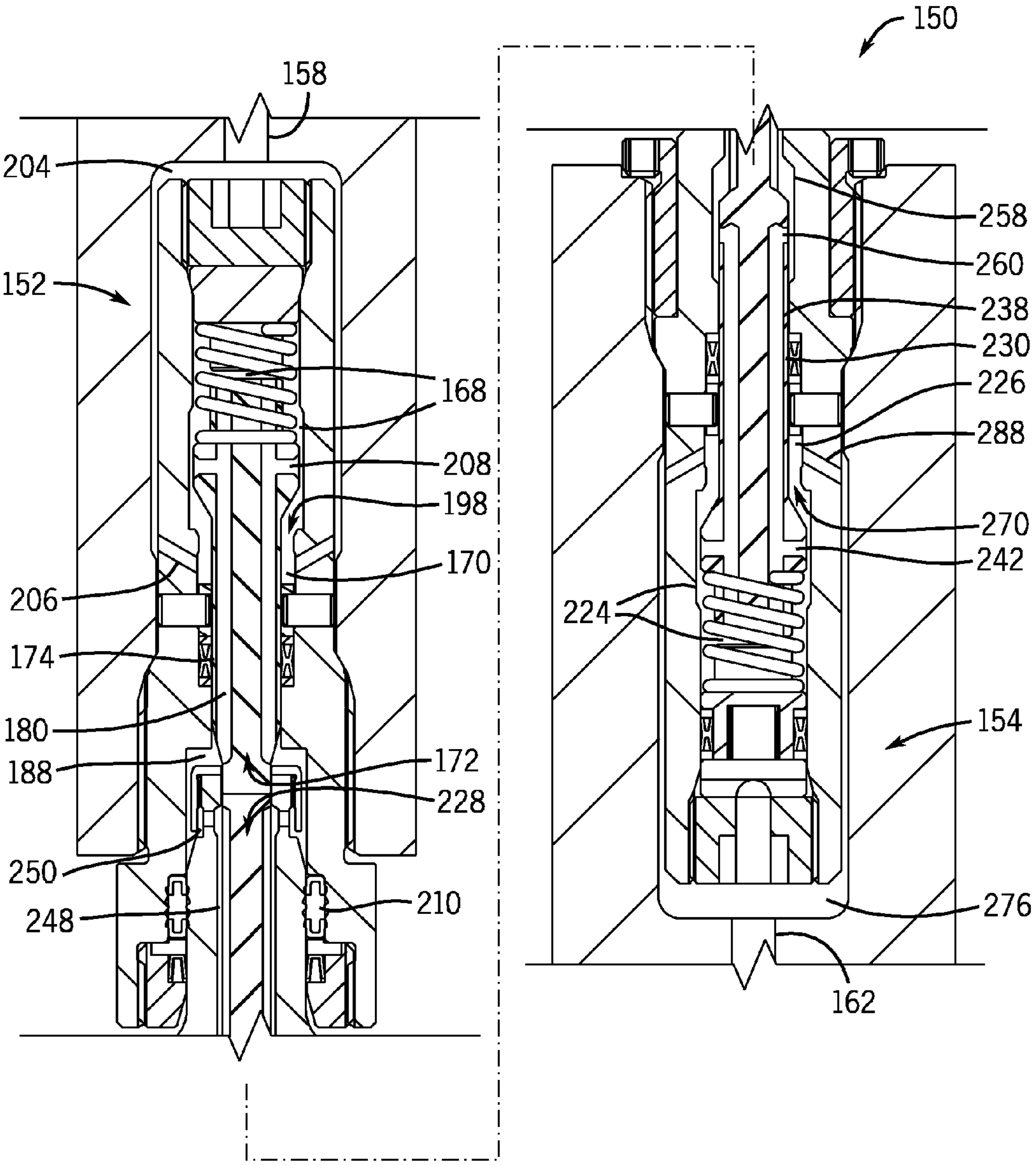
FIG. 14 is a partial cross-section of the engaged components of the hydraulic line coupling illustrated in FIG. 8.

As the female stab 152 and the male stab 154 are pushed together, contact force on the shafts 174 and 230 opens the valves 172 and 228, respectively, as illustrated in FIG. 14. In this illustration, injection chemicals may flow from the fluid source to the chemical injection valve via the following path: hydraulic line 158; coupling cavity 204; radial holes 206; seal cavity 170; opening 198; spring cavity 168; radial holes 208 and axial bores 180; reception area 188; fluid trap 250; fluids passages 248; indentation 258; radial holes 260; axial bores 238 and radial holes 242; spring cavity 224; opening 270; seal cavity 226; radial holes 288; coupling cavity 276; and hydraulic line 162. Furthermore, the seal 210 blocks hydraulic fluid from leaking out of the coupling and heavy drilling fluid from entering the assembly.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:

a chemical injection connector configured to couple chemical injection lines in a mineral extraction system, the connector comprising:

a first coupling configured to be secured to a first chemical injection line, wherein the first coupling comprises a first valve in a first fluid pathway; and a second coupling configured to be secured to a second chemical injection line, wherein the second coupling comprises a second valve in a second fluid pathway;

wherein the chemical injection connector is configured to selectively open and close only one path of flow through the first and second couplings, wherein the first and second valves are automatically biased toward respective closed positions resisting ingress of an external fluid when the first coupling is not mated to the second coupling, wherein the first and second valves are automatically biased toward respective open positions when the first coupling is mated to the second coupling.

2. The system of claim 1, wherein, when the first and second couplings are disconnected and the first and second valves are disposed in the closed positions, the first and second valves are both configured to receive fluid pressure from the external fluid to bias the first and second valves toward the closed positions.

3. The system of claim 1, wherein an internal pressure increase in the first chemical injection line automatically supplements the bias of the first valve toward the closed position when the first coupling is not mated to the second coupling.

4. The system of claim 3, wherein the second valve is configured to automatically release a pressure build-up in the second chemical injection line when the first coupling is not mated to the second coupling.

5. The system of claim 1, wherein the first valve comprises a poppet disposed within the first fluid pathway, wherein the poppet is automatically biased to close an opening in the first fluid pathway.

6. The system of claim 5, wherein the first valve comprises a shaft coupled to the poppet and configured to displace the poppet to open the opening when the first coupling is mated to the second coupling.

7. The system of claim 5, wherein the first valve comprises a spring configured to automatically bias the poppet into the closed position within the opening in the first fluid pathway.

8. The system of claim 5, wherein the first valve comprises a plug configured to automatically supplement the bias of the poppet to close the opening in the first fluid pathway in response to an increase in pressure in the first chemical injection line.

9. The system of claim 5, wherein the first valve comprises a shaft disposed within the first fluid pathway, the shaft comprising;

a sealing portion configured to block the flow of fluid through the first fluid pathway, wherein the shaft is configured to displace the sealing portion to open the opening when the first coupling is mated to the second coupling; and a plurality of bores, notches, or a combination thereof, to enable the flow of fluid at least through or around at least a portion of the shaft.

10. The system of claim 9, wherein the first valve comprises a spring configured to automatically bias the sealing portion into a closed position within the opening in the first fluid pathway.

11. The system of claim 9, wherein the first valve comprises a plug configured to automatically supplement the bias of the sealing portion to close the opening in the first fluid pathway in response to an increase in pressure in the first chemical injection line.

12. The system of claim 1, wherein the chemical injection connector is a non-hydraulic chemical injection connector configured to couple non-hydraulic chemical injection lines in the mineral extraction system.

13. The system of claim 1, wherein the first fluid pathway comprises:

a generally longitudinal bore having a first opening proximate a first connection region of the first coupling configured to interface with a second connection region of the second coupling;

a first cavity in which the first valve is generally disposed, wherein the first cavity is in fluid communication with the generally longitudinal bore;

a second cavity, wherein the second cavity is in fluid communication with the first cavity via a second opening, and the first valve is configured to block the second opening when the first valve is closed; and one or more holes extending from an exterior of the first coupling to the second cavity, wherein the second cavity is in fluid communication with the exterior of the first coupling via the one or more holes when the first valve is closed, and the one or more holes are proximate the first connection region of the first coupling.

14. The system of claim 1, wherein the only one path of flow extends from only the first chemical injection line, through one or more chambers and passages in the first and second couplings, to only the second chemical injection line.

15. A chemical injection line coupler, comprising:

a chemical injection connector configured to couple a first chemical injection line to a second chemical injection line, the chemical injection connector comprising a first coupling configured to be secured to the first chemical injection line, wherein:

the first coupling comprises a first valve in a first fluid pathway;

the first valve is automatically biased toward a closed position when the first coupling is not mated to a second coupling;

the first valve is configured to automatically supplement the bias of the first valve toward the closed position in response to an internal pressure increase in the first chemical injection line while the first coupling is not mated to the second coupling; and the first valve is configured to automatically supplement the bias of the first valve toward the closed position in response to an external pressure from an external fluid while the first coupling is not mated to the second coupling.

16. The coupler of claim 15, comprising the second coupling, wherein:

the second coupling is configured to be secured to the second chemical injection line and comprises a second valve in a second fluid pathway;

the second valve is automatically biased toward a closed position when the first coupling is not mated to the second coupling; and the second valve is configured to automatically release a pressure build-up in the second chemical injection line while the first coupling is not mated to the second coupling.

17. The coupler of claim 16, wherein the first and second valves are configured to automatically close upon disengagement of the first coupling from the second coupling.

18. The coupler of claim 15, wherein the first valve comprises:

a poppet disposed within the first fluid pathway, wherein the poppet is automatically biased to close an opening in the first fluid pathway;

a shaft coupled to the poppet and configured to displace the poppet to open the opening when the first coupling is mated to the second coupling;

a spring configured to automatically bias the poppet into the closed position within the opening in the first fluid pathway; and a plug configured to automatically supplement the bias of the poppet toward the opening in the first fluid pathway in response to an increase in pressure in the first chemical injection line.

19. The coupler of claim 15, wherein the first valve comprises:

a shaft disposed within the first fluid pathway, the shaft comprising;

a sealing portion configured to block the flow of fluid through the first fluid pathway, wherein the shaft is configured to displace the sealing portion to open the opening when the first coupling is mated to the second coupling; and a plurality of bores, notches, or a combination thereof, to enable the flow of fluid at least through or around at least a portion of the shaft;

a spring configured to automatically bias the sealing portion into a closed position within the opening in the first fluid pathway; and a plug configured to automatically supplement the bias of the sealing portion toward the opening in the first fluid pathway in response to an increase in pressure in the first chemical injection line.

20. The coupler of claim 19, wherein the sealing portion comprises a frustoconical protrusion from the shaft.

21. The coupler of claim 15, wherein the first fluid pathway comprises:

a generally longitudinal bore having a first opening proximate a first connection region of the first coupling configured to interface with a second connection region of the second coupling;

a first cavity in which the first valve is generally disposed, wherein the first cavity is in fluid communication with the generally longitudinal bore;

a second cavity, wherein the second cavity is in fluid communication with the first cavity via a second opening and the first valve is configured to block the second opening when the first valve is closed; and one or more holes extending from an exterior of the first coupling to the second cavity, wherein the second cavity is in fluid communication with the exterior of the first coupling via the one or more holes when the first valve is closed, and the one or more holes are proximate the first connection region of the first coupling.

22. A method, comprising:

automatically biasing a first valve in a first mating member into a closed position when the first mating member is disengaged from a second mating member, wherein the first mating member comprises:

a securing member configured to secure the first mating member to a first fluid line; and a fluid pathway, wherein the first valve is configured to block the fluid pathway when the first valve is closed;

automatically supplementing the bias of the first valve toward the closed position in response to an increase in pressure in the first fluid line; and automatically releasing an internal pressure build-up through the first valve while the first mating member is not mated to the second mating member.

23. The method of claim 22, wherein automatically biasing the first valve into the closed position comprises receiving pressure from a spring.

24. The method of claim 22, comprising automatically supplementing the bias of the first valve toward the closed position in response to an external pressure from an external fluid.

25. The method of claim 22, comprising selectively opening and closing only one path of flow through the first and second mating members via opening and closing the first valve in the first mating member and a second valve in the second mating member.

26. The method of claim 21, wherein:

the first mating member comprises a first body having a first shaft bore and a first fluid bore extending separately from a first internal chamber to a first axial end portion, wherein the first valve comprises a first shaft extending along the first shaft bore; and the second mating member comprises a second body having a second shaft bore and a second fluid bore extending separately from a second internal chamber to a second axial end portion, wherein the second valve comprises a second shaft extending along the second shaft bore.

27. The method of claim 22, comprising automatically biasing a second valve in the second mating member closed when the second mating member is disengaged from the first mating member, and automatically releasing a pressure build-up in a second fluid line through the second valve while the first mating member is not mated to the second mating member.

28. A system comprising:

a chemical injection connector configured to couple chemical injection lines in a mineral extraction system, the connector comprising:

a first coupling configured to be secured to a first chemical injection line, wherein the first coupling comprises a first valve in a first fluid pathway;

a second coupling configured to be secured to a second chemical injection line, wherein the second coupling comprises a second valve in a second fluid pathway;

wherein the first and second valves are automatically biased toward respective closed positions resisting ingress of an external fluid when the first coupling is not mated to the second coupling;

a first component;

a second component separate from the first component; and a fluid line connector separate from the chemical injection connector, wherein the fluid line connector has a third coupling configured to couple with a fourth coupling, wherein the first and third couplings are coupled to the first component, the second and fourth couplings are coupled to the second component, and the first and second components are configured to move into engagement with one another to simultaneously couple the first and second couplings of the chemical injection connector and the third and fourth couplings of the fluid line connector.

29. The system of claim 28, wherein the fluid line connector comprises a hydraulic line connector.

30. The system of claim 28, wherein the fluid line connector comprises:

the third coupling configured to be secured to a first fluid line, wherein the third coupling comprises a third valve in a third fluid pathway; and the fourth coupling configured to be secured to a second fluid line, wherein the fourth coupling comprises a fourth valve in a fourth fluid pathway;

wherein the third and fourth valves are automatically biased toward respective closed positions resisting ingress of external fluid when the third coupling is not mated to the fourth coupling.

31. A system, comprising:

a chemical injection connector configured to couple chemical injection lines in a mineral extraction system, the connector comprising:

a first coupling configured to be secured to a first chemical injection line, wherein the first coupling comprises a first valve in a first fluid pathway; and a second coupling configured to be secured to a second chemical injection line, wherein the second coupling comprises a second valve in a second fluid pathway;

wherein the first and second valves are automatically biased toward respective closed positions resisting ingress of an external fluid when the first coupling is not mated to the second coupling;

wherein the first coupling comprises a first body having a first shaft bore and a first fluid bore extending separately from a first internal chamber to a first axial end portion, and the first valve comprises a first shaft extending along the first shaft bore;

wherein the second coupling comprises a second body having a second shaft bore and a second fluid bore extending separately from a second internal chamber to a second axial end portion, and the second valve comprises a second shaft extending along the second shaft bore, wherein the first and second valves are automatically biased toward respective open positions via engagement between the first and second shafts when the first coupling is mated to the second coupling.

32. A system, comprising:

a chemical injection connector configured to couple chemical injection lines in a mineral extraction system, the connector comprising:

a first coupling configured to be secured to a first chemical injection line, wherein the first coupling comprises a first valve in a first fluid pathway; and a second coupling configured to be secured to a second chemical injection line, wherein the second coupling comprises a second valve in a second fluid pathway;

wherein the first and second valves are automatically biased toward respective closed positions resisting ingress of an external fluid when the first coupling is not mated to the second coupling, wherein the chemical injection connector allows only one-way flow of a chemical injection fluid through the first and second couplings.

* * * * *